Dec. 17, 1963  W. H. McDILL  3,114,470
JOINT FOR HONEYCOMB STRUCTURE
Filed Sept. 14, 1960  3 Sheets-Sheet 1

INVENTOR.
WILLIAM H. McDILL
BY
Edwin Coates
-ATTORNEY-

Dec. 17, 1963　　　W. H. McDILL　　　3,114,470
JOINT FOR HONEYCOMB STRUCTURE
Filed Sept. 14, 1960　　　3 Sheets-Sheet 2

INVENTOR.
WILLIAM H. McDILL
BY Edwin Coates
ATTORNEY

Dec. 17, 1963  W. H. McDILL  3,114,470
JOINT FOR HONEYCOMB STRUCTURE
Filed Sept. 14, 1960  3 Sheets-Sheet 3
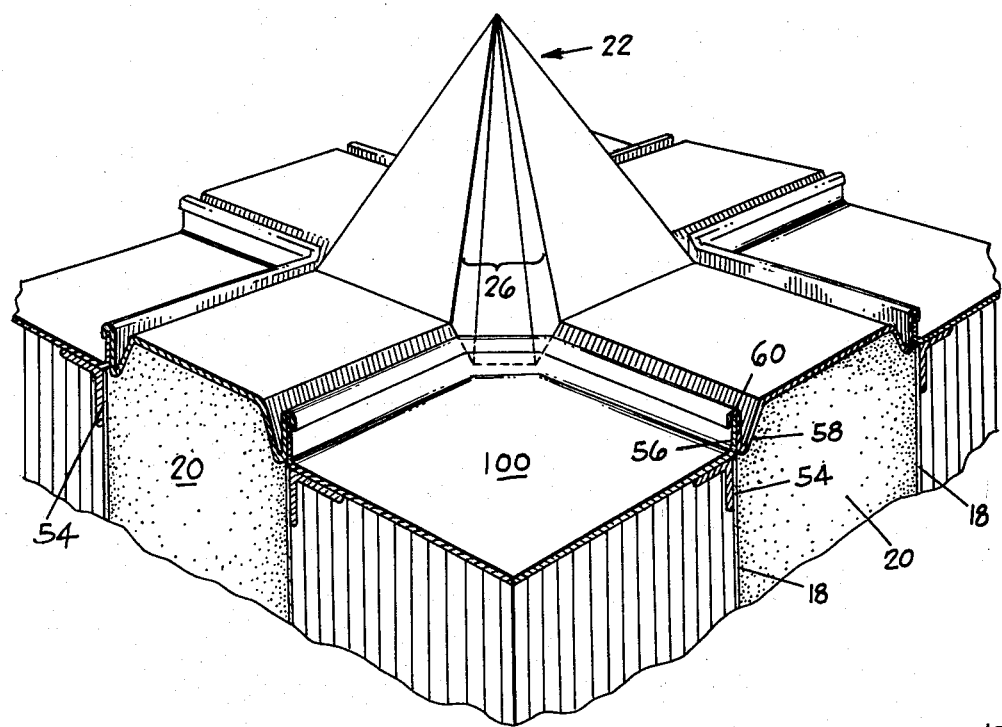
Fig. 5.
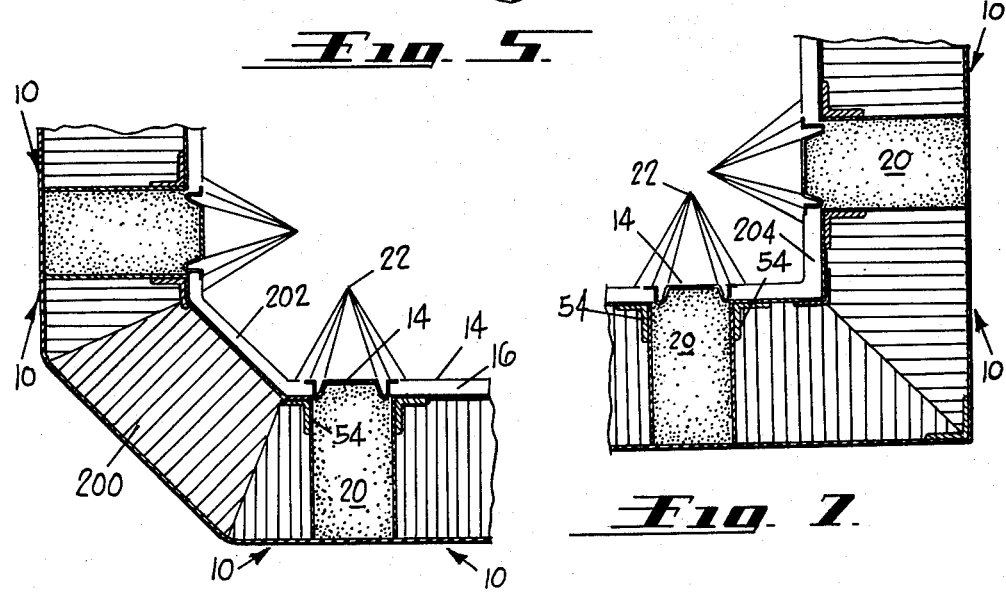
Fig. 6.
Fig. 7.
INVENTOR.
WILLIAM H. McDILL
BY Edwin Coates
ATTORNEY.

3,114,470
JOINT FOR HONEYCOMB STRUCTURE
William Howard McDill, Santa Monica, Calif., assignor to Douglas Aircraft Company, Inc., Santa Monica, Calif.
Filed Sept. 14, 1960, Ser. No. 55,996
1 Claim. (Cl. 220—10)

This invention relates to structures, such as large tanks occupying the holds of cargo-vessels, which tanks are constructed of so-called paper-honeycomb-core structural panels. The invention is specifically concerned with the mode and means of joining together adjacent panels abutting at their corners in coplanar relationship to define the walls of the tanks and as well as with the final product, the novel tank.

Such tanks, or containers, occupying substantially the entire volume of one or more of a ship's holds, constitute a rather large-scale application of low-density core, panel construction, trusses or the like. Many of these tanks, as for gas and oil freighters, exceed 90 feet x 40 feet x 30 feet with each panel having a thickness of 1 or 2 or 3 feet, and hence involve certain operational difficulties arising from thermal forces acting on the panel jointures.

When such tanks are employed in the transportation of liquefied, and therefore low-temperature, gases, such as methane ($CH_4$), linear and volumetric thermal expansion and contraction problems of a serious order have heretofore invariably arisen. One of these problems has to do with the detrimental effects on the integrity of the jointures of adjacent panels, and hence on the integrity of the tank, of these wide variations in the temperatures of the tank's various contents. These problems concern leakage of the contents from the tank and this leakage arises from the gaps, small though they may be, opened up between abutting panels at the conventional type of jointure between panels under thermal influences.

For example, the temperature of liquefied methane, under normal pressure, purity and humidity conditions is of the order of −259° F. Thus, when empty tanks at ambient temperature are filled with this methane, there occurs more than a slight amount of shrinkage, at least at the contacted metal facing-plates constituting the inner surface of the tank. This contraction, of course, strongly tends to separate the jointures and, indeed, has often been found to actually separate the panels at the jointures, leaving detrimental leakage-gaps.

Upon emptying the cooled tanks of the liquefied methane, the opposite action occurs. The ambient air, at a temperature much higher than that of methane, then fills the tank, eventually imposing an expansive effect on the panels toward their common juncture in the one plane, which action places the jointures under compression as contrasted to the tension load applied thereto by the shrinkage of the inner skins of the abutting panels due to the cold methane, or any cryogenic fluid.

There has been no jointure heretofore proposed for these purposes which eventually neither "jams" under this compression nor ruptures under this tension, both acting primarily on the inner metal facing-off plates of honey-comb core structural panels in such tanks.

Subject invention provides a mode and means of effecting the jointure of the large, thick, large-area, oblong, metal-faced honeycomb panels for large tanks and other containers which neither ruptures nor jams under the effects of extremely low temperatures or higher temperatures. It is a jointure which therefore remains liquid-and-gas tight under the severest temperature variations encountered by such containers ocnstructed of such panels.

Roughly stated, the invention provides, in the region lying between the four adjacent corners of any four panels abutting at their adjacent corners and lying in one and the same plane and constituting all, or a portion of a wall, certain means that virtually constitute a resilient, substantially indestructible stress reliever that, in effect, constitutes an expansion and contraction absorbing three-dimensional continuation, in this gap-region between panels, of the adjacent corners of the inner metallic faces of the four mutually-approached panel-corners.

In the physical form which is now preferred, this jointure construction assumes a configuration that includes, first, a general octagonal pyramid, actually a 16-sided geometrical solid, with its base lying in the general plane of the co-planar panel-corners. The apex of the pyramid may be directed, or lie, either inwardly or outwardly of the tank's interior. There are four major base-edges of the pyramid that are directed toward junction with the adjacent ends of respective channel-pieces that unite the sides, not the corners, of the adjacent panels that lie co-planar in this region. These four major base-lines of the pyramid are fixedly attached to the adjacent ends of the respective channels as by welding, brazing or the like. These channel ends do not extend fully to the respective corners of the mutually approached panels.

The four adjacent corners of the panels together with the flexible flanges of the channels, are mitred, or cut off on a diagonal, to provide for respectively fixing them permanently to the respective remaining four sides of the pyramid, each of these latter sides being, not planar, but concave or dished in by means of three re-entrant surfaces at each of these remaining four faces. Some of these base edges are fixed to the channels' flanges and some to the mitered metallic corners of the panels. However, the pyramid still remains essentially, or generally, octagonal as to the general conformation of its base. The undished, or planar, four sides of the pyramid, at their base edges, are fixed ot the rectangular adjacent ends of the webs of the channels.

Accordingly, when the panels thermally expand together at the junction region of any four of them, due to heat or to being "empty," that is, occupied by air from 78° F. to 125° F., the perimeter of the base of the pyramid is constricted and the altitude, or height, of the pyramid increases. Then there arise stresses that otherwise most certainly would, eventually, in the case of all known means, tend to jam the panel corners together to the detriment of the jointure and the panel thereat and possibly set up "buckling" farther out in the panels. Such action has been known, further, to shear the face-plates off the paper cores, with obvious undesired consequences.

On the other hand, when the tank is filled with liquid methane at −259° F., as the inner skins of the tank undergo shrinkage away from the pyramid and the base-area of the pyramid enlarges accordingly, the apex and height of the pyramid sink and its sides spread laterally concomitantly to an extent necessary to absorb and dissipate these cold-shrinkage stresses.

Several of the presently preferred embodiments of these, and other concepts are representationally depicted, by way of example only, in the accompanying drawings. These embodiments will, in order to render the concepts more concrete, be hereinafter described, part-by-part, in conjunction with these drawings.

In these drawings:

FIG. 1 is a cross-sectional view of a tanker-ship's hold, incorporating one of the present tanks;

FIG. 2 is an isometric view, partly sectional and partly fragmentary, of a portion of a side or end or bottom wall of a tank or other container which is constructed of metal faced, paper honeycomb core panels, subject to considerable variations in temperature due to the nature of its various contents, the container being in its normal condition, that is in which the tank is devoid of cold liquids and contains air, and in which the panels, or at least their metallic inner skins, are more expanded toward the pyramid than when the tank is filled with a cold liquid;

FIG. 3 is a top plan view of this same portion of the tank-wall, showing the relative locations of its components under varying temperature conditions, the solid lines representing the locations of the parts with the tank containing air or a high-temperature fluid and hence expanded, and the broken lines illustrating the positions of these same parts when the skins are shrunk in two directions in the plane of the wall under the effects of a contraction-effecting cold fluid;

FIG. 5 is a view similar to that of FIG. 2 but illustrating another mode of joining the co-planar panels at their adjacent, or mutually confronting, edges;

FIG. 6 is a detailed sectional view of one mode of joining side walls to the bottom wall showing that the pyramid construction cannot be employed in the apices of the corners where expansion and contraction forces of course do not lie in one and the same plane; and FIG. 7 is a similar view showing another mode of corner construction.

Figure 1:
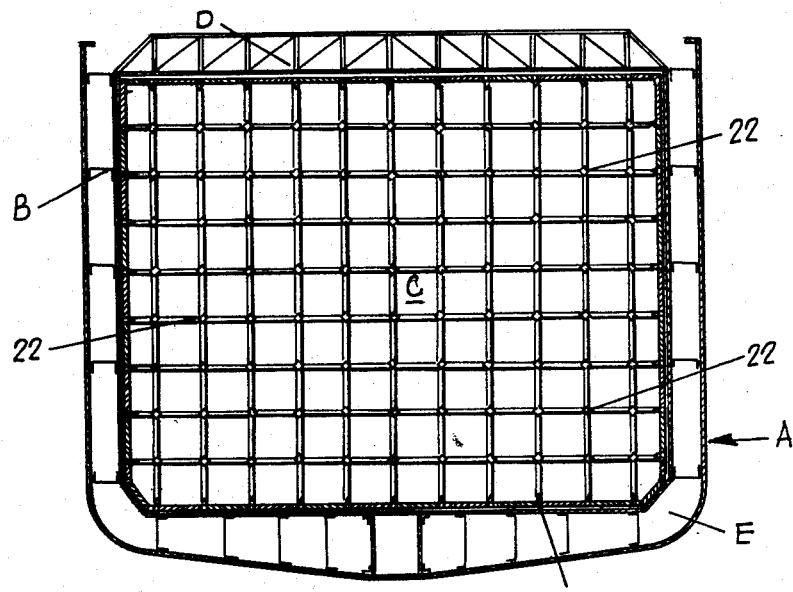

In FIG. 1, a tanker-ship's hull A is shown as defining a hold B of general parallelopipedal form but with rounded bilge framing E, to which the tank must conform tightly to prevent shifting of cargo in a seaway. The hold contains a tank C conforming to the hold and closed gas-tightly by a cover D. A hatch-cover, not shown, tops off the tank containing hold in the usual manner.

Figure 2:
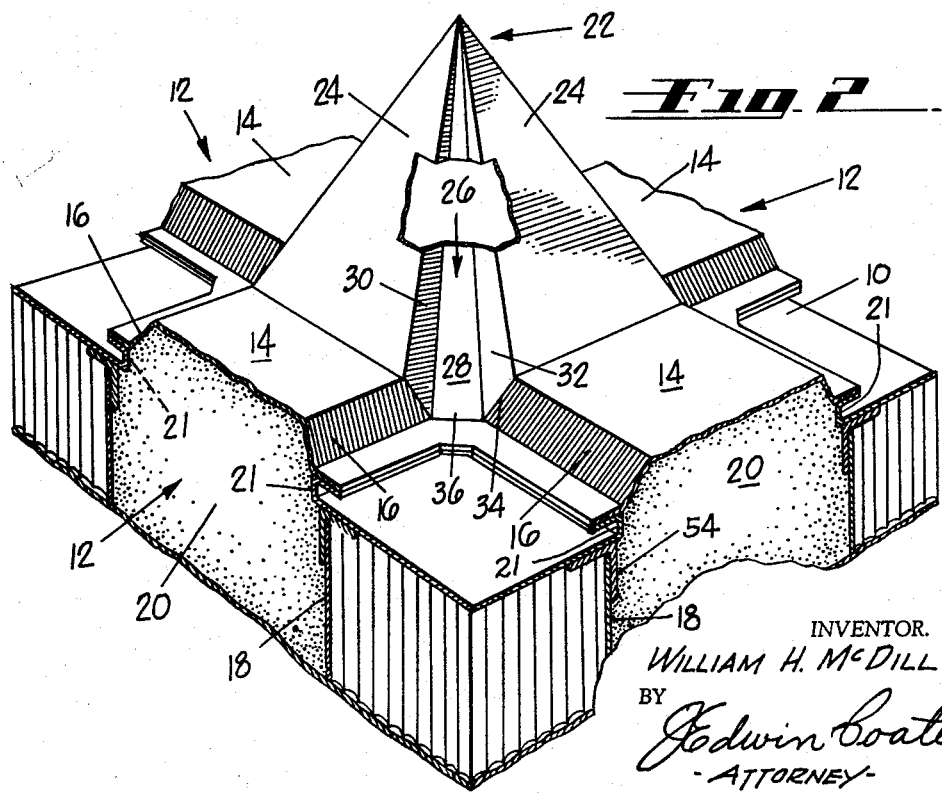
Figure 3:
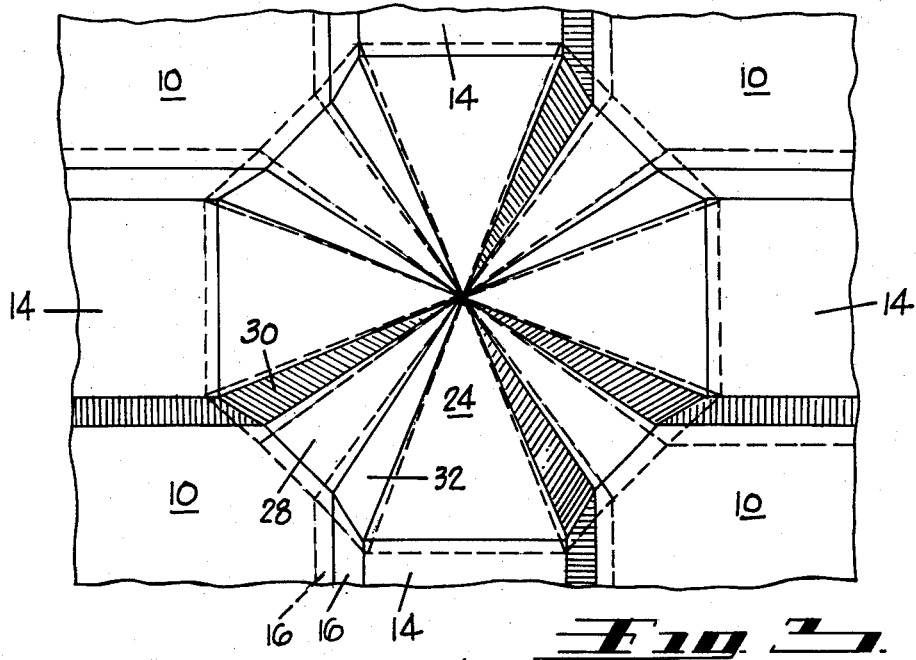
Figure 4:
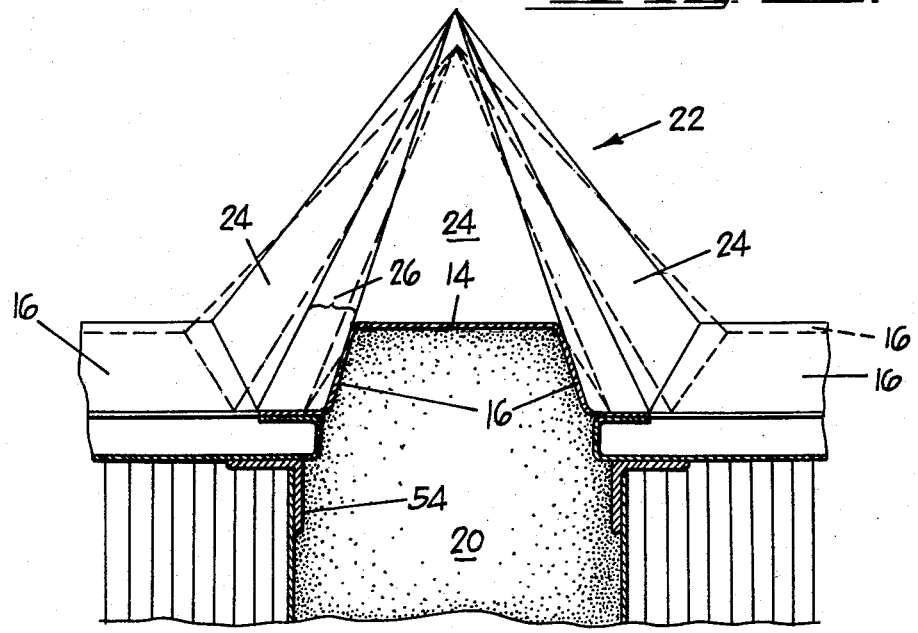
FIG. 4 is a side view of this same portion of the tank wall, showing the cold-effected shrinking positions of the parts caused by contraction of the inner skins, in broken lines and their air-expanded, or their normal positions, in solid lines.

In FIGS. 2–4, inclusive, there are shown four co-planar structural panels 10 constructed of a low-density honeycomb core made of reticulate kraft paper, for example, and faced-off on their two opposite major faces with metallic, planar sheets, in the conventional manner.

However, since the container or tank defined by such walls is contemplated as being of the order of 90 feet by 40 feet by 30 feet, with the thickness of each panel's core, being of the order of 1–3 feet, and must alternately be occupied by a low temperature liquefied gas, such as liquid methane, $CH_4$, at $-259°$ F. and then emptied of this liquid, thus then filling the tank with air at ambient temperatures ranging as high as 125° F., as in the tropics, etc., the expansion and contraction of the panels and connecting means presents a by no means negligible situation concerning the effects of these temperature differentials on the fluid-tight integrity of the jointures between the panels constituting the tank-walls.

This invention solves this and other problems by providing, at the junction of the corners of each four co-planar panels, panel-connecting means including expansion joint means. The latter consists of four panel-joining inverted channel members 12 and a generally octagonal-pyramidal, stress and movement absorbing or neutralizing pyramid 22 which accommodates, through the channels 12, the contraction and expansion of the inner skins of the panels.

The channels 12 include webs 14 and flexible angled flanges 16, the latter being attached, as by brazing at their longitudinal edges, to the sub-adjacent edges of the facing plates of the co-planar panels 10. These sub-adjacent inner edge-portions of the metallic inner skin of the assembly of panels 10 preferably, but not mandatorily, include a back-bent, or return-bend, or recurved, channel-section like portion 21. Each formation 21 extends longitudinally along each inner edge of each skin of each panel 10 from an outer panel edge to the inner corner of the panel. Portions 21 have a large enough vertical and lateral extent and thinness sufficient to complement and enhance the flexibility of the portions 16 of the channels, so that upon the inner skins being "shrunk" by excessively cold tank contents, the first or upward flexure will occur in the portions 21, thereby relieving the welded joint between 16 and the skins from excessive strains. Similarly, upon expansion, these portions will close together and also relieve the weld. Each of the thickness-wise extending edges of each panel is faced-off by a metallic plate 18, the channels 12 and plates 18 thus defining a hiatus between the edges of any two adjacent panels. The facing-off inner plates shrink to broken line positions from their normal, solid-line positions.

The gap is occupied either by an insulating filler 20, such as a resilient plastic or foamed plastic, one of the polyurethanes, for example and preferably polystyrene, although homologues of the latter are also usable.

This foamed plastic material can be compressed, as under the contraction of the tank walls without crumbling, so long as its elastic limit is not exceeded, yet when compressive forces are removed, it will, within its elastic limit, recover its original cubic dimensions. Similarly, it has a coefficient of cubic expansion that, coupled with the foregoing property, endows it with sufficient elastic resilience to follow closely the deformation or distortion of the jointure and the parts, thus assisting in maintaining the fluid-tight integrity of the expansion jointures and of the spacing of the panels. When the plastic is removed, access is afforded to the channels 12 and to the pyramid. The inner ends of the flange webs are rectangular whereas the corresponding ends of the angled flanges 16 are mitered and both end edges are joined, as by brazing, to the respective adjacent base-sides of the pyramid.

The pyramid 22 includes four planar faces 24 and four concavities, or re-entrant sides 26. Each concavity, or re-entrant side, 26, includes a central planar portion 28 and two angled portions, 30 and 32. Faces 30 and 32 are brazed at 34 to the angled flanges of the channels, whereas 28 is brazed at 36 to the adjacent metallic facing-off plate of a panel.

Inspection of FIGS. 2–4, inclusive, will reveal that by virtue of the aforedescribed parts and arrangements, any four co-planarly joined panels are capable of a thermally initiated two-way stretch in their common plane without subjecting any panel's facing-off sheet or any core or panel-jointure to such stretch-loading, due to cold shrinkage or heat expansion, as might result in shearing the sheet from its core or opening up the joint. For, the necessary flexibility of the jointure is conferred substantially entirely by the flexure or other bending occurring at, or in, the channels and in the pyramid. Consequently, shrinkage of the inner "skins" of the panels under the contractive effect of extremely low-temperature tank contents, is obviated, since all four panels can move mutually away from each other in two directions in the one common plane without producing any sort of structural failure. The pyramid and channels, by undergoing enlargement of their base-area and consequent decrease of its height-altitude, or dropping of their apex, absorb all unbalanced forces and accommodate working of the channels.

Similarly, when the panels and skins expand toward the pyramid, as when warm air or liquid occupies the tank, the pyramid increases in height-altitude, that is, its base area diminishes and its apex rises. By the same token, therefore, it again absorbs all unbalanced forces, which forces now act in the opposite directions from those aforementioned.

The somewhat diagrammatic showings in FIGS. 3 and 4 indicate the actions which occur, the broken lines representing the effects of cold-shrinkage of the inner facing-off sheets of the panels away from the pyramid and the solid lines representing the effects of heat expansion of the tank walls toward the pyramid. These solid lines may also be taken as indicating the normal positions of the parts with the tank "empty," that is, filled with air at room temperature, or thereabout.

The foamed plastic fillers, 20, of course follow the respective movements of the parts, within the elastic limit of the plastic. Preferably, the pyramids extend inwardly of the tank to obviate external projections, but it is obvious that they will function just as well if they protrude outwardly from the outer surface of the tank, the only difference lying in the fact that the tank will then occupy a greater overall volume in the ship's hold, or the like, and the protrusions may be objectionable to passersby.

In FIG. 5, the concepts of this invention are shown as applied to panels whose facing-off sheets are united to the channels and to the pyramid in a manner somewhat different from the mode employed for the inner skins in FIGS. 1-3, inclusive, these species being otherwise predicated upon the aforestated principles.

In this latter species, the cores are provided with angle-extrusions 54 bounding their upper and lower edges and to 54 are brazed the skins 100 of the panels as well as side-facing and gap defining plates 18, extending the full thickness-wise extent of the core. Polystyrene filler, 20, occupies the gap between adjacent plates 18, as before.

Each skin plate 100 has its inner edges formed as upturned flanges 56 and each channel 12 has its angled flanges recurved as at 58, the outer end of each 58 being crimped onto the flanges 56, as at 60. In addition, brazing may also be employed to further strengthen the union.

It will be noted that no sort or type of hinging-action necessarily occurs in either of the species of the present device and hence, contrary to the prior art, no flange in the construction undergoes a true hinging-action in itself. Rather, the channel members accept the flexures consequent upon movements of the panel's inner skins or of the entire panel if it should be subjected to a sufficient amount of thermal influences. The pyramids, being united to the channels, accommodate the forces due to alternate spread and constriction of the channels.

The included angle at the apex of the pyramid is contemplated as initially being an arcuate angle, in order to minimize the lateral-displacement movements of the various faces of the pyramid.

Also contrary to conventional practice is the fact that it is not necessary that any panels be a regular square; they can be quite elongate or oblong.

In FIGS. 6 and 7, since the channel and pyramid configuration cannot be used at the tank's corners, inasmuch as the forces do not lie bi-directionally in the same plane, a filler-construction is employed. In FIG. 6, this consists of a honeycomb panel segment 200 united on its inner face to the channels by means of a channel 202. Other than being bevelled to fit with 200, the panels 10 are the same as before.

In FIG. 7, the segment 200 is omitted, the abutting panels 10 being matingly bevelled at their abutting edges and the channel 204 being of a different shape but serving the same purpose.

It will be apparent to those skilled in the art that various changes and modifications may be made without departing from the spirit of the invention, and it is intended that all such changes and modifications shall be embraced within the scope of the following claim.

I claim:

A jointure arrangement in a segmented wall of a container for cryogenic material which container is subjected to extremes of temperature, comprising:

a plurality of planar panels arranged in mutual coplanarity, there being a vacant region between the four adjacent, coplanar corners of each four of the panels and the juxtaposed inner corners of the panels being mitered;

each of said panels having a core composed of reticulated, or honeycombed paper and each panel having a planar metallic plate facing off the opposite faces of the core;

the outer face of each of said plates being facewise bonded only to the cell-ends of the inner face of the core;

the bond consisting of a thin layer of brittle material susceptible to thermally-induced shear forces that would separate the inner plate from the core, thus rupturing the container;

flexible, planar-sided, panel-uniting channel members interposed between each two of the adjacent panels, said members terminating far short of said vacant region, each channel member being united to the adjacent edges of the adjacent inner metallic plates;

said channel members being formed with pre-established flexure lines running longitudinally thereof, and an expansion-and-contraction absorbing polyhedral formation disposed in, and protruding from, each of said vacant regions, said formation having planar faces formed with predetermined flexure-lines at the juncture of each pair of said faces;

the respective base-sides of said formation being united, respectively, directly to the inner ends of said channel members and, respectively, directly united to the inner mitered corners of the juxtaposed plates;

whereby the protuberances receive, and remove from said bond, the aforesaid shear stresses that tend to separate the inner plate from the core, thereby to maintain each jointure and all the panels intact and integral under extreme variations in temperature of the container.

References Cited in the file of this patent

UNITED STATES PATENTS

| | | |
|---|---|---|
| 1,799,234 | Huff | Apr. 7, 1931 |
| 2,901,063 | Voegeli | Aug. 25, 1959 |
| 2,944,693 | Benson et al. | July 12, 1960 |

FOREIGN PATENTS

| | | |
|---|---|---|
| 1,200,239 | France | June 29, 1959 |